US012638944B2

(12) United States Patent
Vadivel et al.

(10) Patent No.: US 12,638,944 B2
(45) Date of Patent: May 26, 2026

(54) ADAPTIVE ACCIDENTAL CONTACT MITIGATION FOR TOUCH DATA CLASSIFICATION

(71) Applicant: Synaptics Incorporated, San Jose, CA (US)

(72) Inventors: Karthikeyan Shanmuga Vadivel, San Jose, CA (US); Mohamed Sheik-Nainar, San Jose, CA (US); Patrick A. Worfolk, Los Gatos, CA (US); Ming-Wei Chang, Taipei City (TW)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/768,415

(22) Filed: Jul. 10, 2024

(65) Prior Publication Data

US 2025/0085813 A1     Mar. 13, 2025

Related U.S. Application Data

(60) Provisional application No. 63/581,530, filed on Sep. 8, 2023.

(51) Int. Cl.
*G06F 3/041* (2006.01)

(52) U.S. Cl.
CPC ................................. *G06F 3/04186* (2019.05)

(58) Field of Classification Search
CPC .................................................. G06F 3/04186
See application file for complete search history.

(56) References Cited

U.S. PATENT DOCUMENTS

| | | | | |
|---|---|---|---|---|
| 11,797,100 B1 * | 10/2023 | Fan | ......................... | G06F 3/011 |
| 2023/0049801 A1 * | 2/2023 | Lee | ..................... | G06F 3/04883 |
| 2024/0329825 A1 * | 10/2024 | Ron | ...................... | G06F 3/0488 |

* cited by examiner

*Primary Examiner* — Chun-Nan Lin
(74) *Attorney, Agent, or Firm* — Leydig, Voit & Mayer, Ltd.

(57) ABSTRACT

A system for classifying touch data is provided. The system comprises: a plurality of sensing elements; and a processing system. The processing system is configured to: receive touch data from a current user via the plurality of sensing elements; determine a first set of classifier parameters corresponding to a current user based on usage data, wherein the usage data comprises the touch data from the current user, and apply the first set of classifier parameters to classify subsequent touch data.

20 Claims, 11 Drawing Sheets

640

642 — Detect an event that triggers an adjustment to an update speed of user characteristics.

644 — Update the user characteristics based on the adjusted speed.

646 — Determines a set of ACM parameters based on the updated user characteristics.

648 — Classify a user input based on the set of ACM parameters.

*700*

Train database of finger/thumb/palm touch contacts
*702*

Compute usage characteristics of finger-swipe-mean
*704*

Compute per-user optimal ACM classifier parameters
*706*

Train the model to optimally predict ACM classifier parameters based on the finger-swipe-mean
*708*

Test database of real-world usage data
*710*

Evaluate user-adaptive model performance
*712*

800

Classification output

| Ground truth | Palm | Finger | LightPalm | Thumb | Unknown | Hover | SmallObj | NegFinger | None |
|---|---|---|---|---|---|---|---|---|---|
| Palm | 0 | 1 | 0 | 1 | 0.5 | 0 | 1 | 1 | 0 |
| Finger | 1 | 0 | 1 | 0.2 | 0.5 | 0.5 | 1 | 1 | 0 |
| Thumb | 1 | 0.2 | 1 | 0 | 0.5 | 0.5 | 1 | 1 | 0 |

ADAPTIVE ACCIDENTAL CONTACT MITIGATION FOR TOUCH DATA CLASSIFICATION

CROSS-REFERENCE OF RELATED APPLICATIONS

This application claims the benefit of U.S. Provisional Application No. 63/581,530, filed Sep. 8, 2023, the entirety of which is incorporated herein by reference.

FIELD

The disclosed embodiments relate generally to touch sensors that may be integrated within electronic devices.

BACKGROUND

Input devices including touch sensor devices (e.g., touchpad sensors, touch screen displays, etc.) are used in a variety of electronic systems. Touch sensor devices typically include a sensing region, often demarked by a surface, in which the touch sensor device determines position information (e.g., the presence, location, and/or motion) of one or more input objects, typically for purposes allowing a user to provide user input to interact with the electronic system.

Touch sensor devices, such as touchpads, are typically operated using finger and thumb interactions. However, due to the placement of the touchpad (directly under keyboard), it's common for users to unintentionally contact the touchpad with their palm while interacting with keyboard. This issue is further exacerbated by more recent iterations of touchpad designs where the size of the touch region is considerably larger. Additionally, with the introduction of additional features (e.g., FORCEPAD and CLICK-ANY-WHERE model), users are increasingly using thumbs to make quick interactions with the touchpad while typing on the keyboard or performing other activities. In some cases, finger and thumb contacts may be intentional, while palm contacts may be accidental. In this context, it is crucial to correctly classify a thumb as valid contact and not suppress it as a palm. Failing to do so can compromise the user experience. This issue is known as an accidental contact mitigation (ACM) problem, which involves classification between finger/thumb and palm categories.

In view of the foregoing, there is a need to correctly distinguish intentional touch inputs from unintended or accidental touches on touch-sensitive devices.

SUMMARY

A first aspect of the present disclosure provides a system for classifying touch data, comprising: a plurality of sensing elements; and a processing system configured to: receive touch data from a current user via the plurality of sensing elements; determine a first set of classifier parameters corresponding to a current user based on usage data, wherein the usage data comprises the touch data from the current user; and apply the first set of classifier parameters to classify subsequent touch data.

A second aspect of the present disclosure provides a method for classifying touch data, comprising: receiving, by a processing system, touch data from a current user; determining, by the processing system, based on usage data, a first set of classifier parameters corresponding to the current user, wherein the usage data comprises the touch data from the current user; and applying, by the processing system, the first set of classifier parameters to classify subsequent touch data.

A third aspect of the present disclosure provides a non-transitory computer-readable medium, having computer-executable instructions stored thereon for classification of an input object using an input device, wherein the computer-executable instructions, when executed, facilitate performance of the following: receiving touch data from a current user; determining, based on usage data, a set of classifier parameters corresponding to the current user, wherein the usage data comprises the touch data from the current user; and applying the first set of classifier parameters to classify subsequent touch data.

Figure 1:
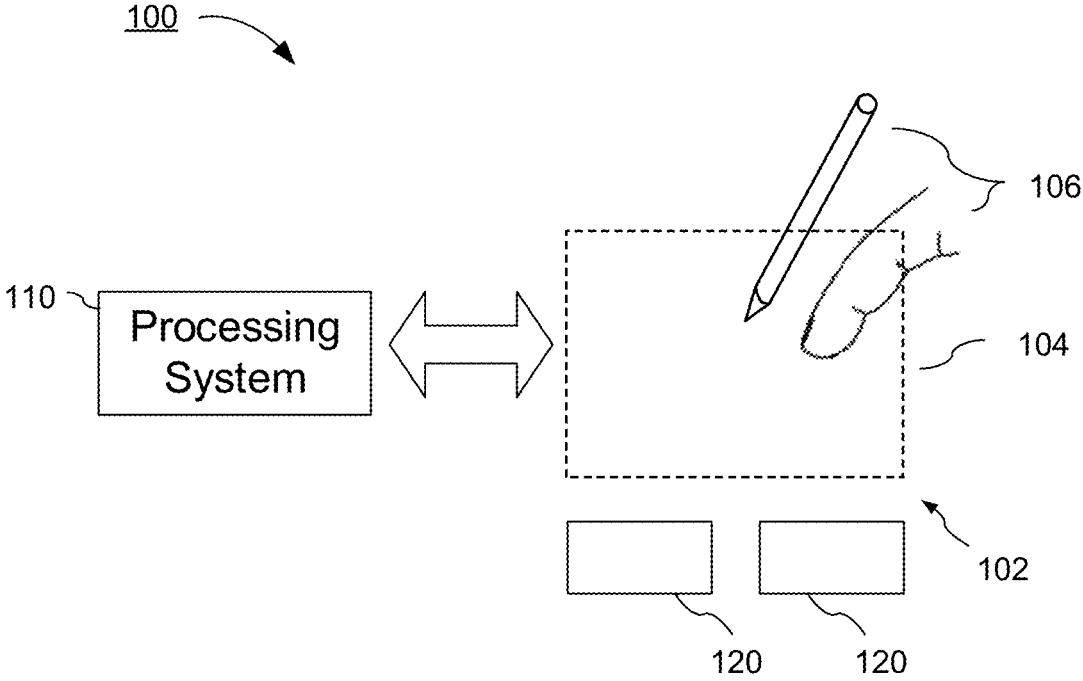
FIG. 1 is a block diagram of an example of an input device having a touch sensor, in accordance with certain embodiments.

It is contemplated that elements disclosed in one embodiment may be utilized on other embodiments without specific recitation. The drawings referred to here should not be understood as being drawn to scale unless specifically noted. Also, the drawings may be simplified, with details or components omitted for clarity of presentation and explanation. The drawings and discussion serve to provide examples to explain principles discussed below, where like designations denote like elements, and the drawings should not be interpreted as being limiting based on a specific exemplary depiction.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding field, background, summary, brief description of the drawings, the following detailed description, or the appended abstract.

The terms "coupled with," along with its derivatives, and "connected to" along with its derivatives, may be used herein, including in the claims. "Coupled" or "connected" may mean one or more of the following: "coupled" or "connected" may mean that two or more elements are in direct physical or electrical contact; "coupled" or "connected" may also mean that two or more elements indirectly connect to each other, e.g., not in physical contact, but yet still cooperate or interact with each other, and may mean that one or more other elements are coupled or connected between the elements that are said to be coupled with or connected to each other.

Example embodiments of the present disclosure accurately, reliably and efficiently classify different types of contacts proximate to a touch sensor of input devices subject to different users, and thereby improve overall user experience with respect to electronic devices utilizing principles of the present disclosure.

The system and method incorporate adaptive accidental contact mitigation (ACM) to predict an optimal parameter set for each user by analyzing usage characteristics. The optimal parameter set is used to adapt the classification process in the system and method to a specific user. For example, a classifier used by the system and method for classifying input contacts is updated based on the optimal parameter set. This allows the performance of the system and method to be enhanced through customized optimization.

In some embodiments, the adaptive ACM determines a finger swipe mean based on the usage data and/or uses the finger swipe mean to determine a set of classifier parameters for classification of the input data (e.g., user touches sensed by an input device).

In some embodiments, the adaptive ACM continuously updates the set of classifier parameters based on usage characteristics to dynamically adapt to user interactions. This enables the adaptive ACM to correctly classify the user touches based on the dynamically updated classifier parameters. For example, the adaptive ACM may correctly classify a thumb as valid contact, ensuring it is not suppressed as a palm. This improves the discrimination between intentional contacts, such as controlling the cursor or clicking, and unintentional contacts that may occur while typing on the laptop keyboard or performing other activities.

In some embodiments, the adaptive ACM is utilized in conjunction with a deterministic ACM process to classify touch contacts into finger, thumb, palm, and other categories. The deterministic ACM process begins with a predefined set of classifier parameters. Then, the adaptive ACM process dynamically adjusts these parameters based on touch characteristics.

The adaptive ACM algorithm functions autonomously, requiring no user feedback. The adaptive ACM process can reduce the ACM misclassification score by, for example, approximately 43% on a relatively large test dataset comprising 25 users. Furthermore, a dynamic version of the adaptive ACM process, which determines user characteristics on-the-fly during touchpad usage, has demonstrates promising results.

FIG. 1 is a block diagram of an exemplary input device 100. The input device 100 may be configured to provide input to an electronic system. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets—including foldable tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones—including foldable and rollable smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, a touch sensor 102 is included with the input device 100. The touch sensor 102 comprises one or more sensing elements configured to sense input provided by one or more input objects 106 in a sensing region 104. Examples of input objects include fingers, styli, and hands. Sensing region 104 encompasses any space above, around, in and/or near the touch sensor 102 in which the input device 100 is able to detect user input (e.g., user input provided by one or more input objects). The sizes, shapes, and locations of particular sensing regions may vary from embodiment to embodiment. In some embodiments, the sensing region 104 extends from a surface of the input device 100 in one or more directions into space until signal-to-noise ratios prevent sufficiently accurate object detection. The distance to which this sensing region 104 extends in a particular direction, in some embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 in combination with some amount of applied force or pressure, and/or a combination thereof. In some embodiments, input surfaces may be provided by surfaces of sensor substrates within which or on which sensor elements are positioned, or by face sheets or other cover layers positioned over sensor elements.

The input device 100 may utilize any suitable combination of sensor components and sensing technologies to detect user input in the sensing region 104. Some implementations utilize arrays or other regular or irregular patterns of multiple sensing elements to detect the input. Exemplary sensing techniques that the input device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques.

In but one example, the input device 100, for example, includes a touch sensor 102 that uses capacitive techniques where a voltage or current, referred to as a sensing signal, is applied to create an electric field. Nearby input objects cause changes in the electric field, and produce detectable changes in capacitive coupling that may be detected as changes in voltage, current, or the like referred to as a resulting signal. The sensor 102 includes, for example, sensor electrodes 252, 254 (FIG. 2), which are utilized as capacitive sensing elements.

One exemplary capacitive technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit one or more transmitter signals. Receiver sensor electrodes may be held substantially constant relative to the reference voltage to facilitate receipt of one or more resulting signals. The reference voltage may be a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference or other electromagnetic signals. When one or more input objects are present in a sensing region of the sensor, a resulting signal may also comprise effect(s) corresponding to the one or more input objects.

The input device 100 includes a processing system 110. The processing system 110 comprises parts of or all of one or more integrated circuits (ICs) and/or other circuitry components, which may include an integral or separate non-transitory memory for storing data and/or computer executable instructions according to the various methods and processes described herein. The processing system 110 is coupled to (or configured to couple to) the touch sensor 102, and is configured to detect input in the sensing region 104 using sensing hardware of the touch sensor 102. In some embodiments, the processing system 110 includes electronically-readable instructions, such as firmware code, software code, and/or the like. The processing system 110 can be implemented as a physical part of the sensor 102, or can be physically separate from the sensor 102. Constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs with associated firmware separate from the central processing unit (CPU). As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in the sensing region 104. The processing system 110 may perform any appropriate amount of processing on the electrical signals in producing the information provided to the electronic system. For example, the processing system 110 may digitize analog electrical signals obtained from the sensing elements, e.g., sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The touch sensor 102 is configured to detect position information of an input object 106 within the sensing region 104. The sensing region 104 may include an input surface having a larger area than the input object. The touch sensor 102 may include an array of sensing elements, such as capacitive sensing elements, with a resolution configured to detect a location of a touch to the input surface. In some embodiments, a pitch of the touch sensing elements or a spacing between an adjacent pair of the touch sensing elements is between 2 and 6 mm, although it will be appreciated that other geometries may be suitable.

In some embodiments, the input device 100 is implemented with additional input components that are operated by the processing system 110 or by some other processing system. These additional input components may provide redundant functionality for input in the sensing region 104, or some other functionality. FIG. 1 shows buttons 120 near the sensing region 104 that can be used to facilitate selection of items using the input device 100. Other types of additional input components include sliders, balls, wheels, switches, and the like. Conversely, in some embodiments, the input device 100 may be implemented with no other input components.

Figure 2:
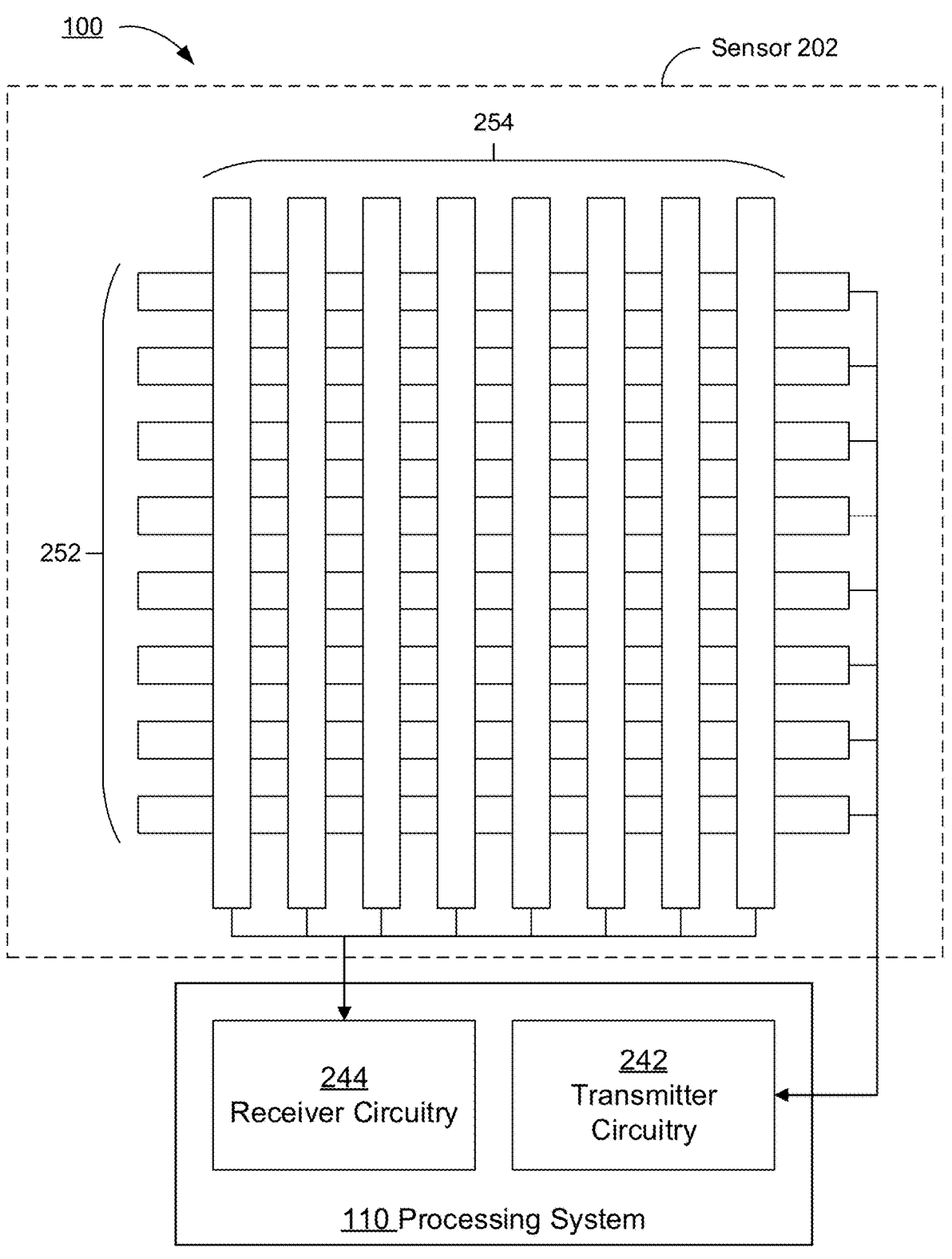
FIG. 2 is a block diagram of an example of a touch sensor with sensor elements in the form of capacitive sensing electrodes and corresponding control circuit in accordance with certain embodiments.

Referring to FIG. 2, an example of an input device 100, which includes in certain embodiments electrodes to facilitate capacitive touch sensing. For example, the processing system 110 includes transmitter circuitry 242 and receiver circuitry 244. The transmitter circuitry 242 includes one or more transmitter circuits (e.g., drivers, etc.) configured to transmit one or more transmitter signals (sensing signals) with one or more transmitter sensor electrodes 252 of a sensor 202 wherein the sensor 202 may be the touch sensor 102 previously described. The receiver circuitry 244 includes one or more receiver circuits (e.g., analog front ends, analog-to-digital converters, etc.) configured to receive one or more resulting signals with one or more receiver sensor electrodes of the touch sensor 102. The transmitter circuitry 242 may be coupled to the one or more transmitter electrodes 252 directly or through one or more intermediate electrical components (e.g., multiplexers, switches, amplifiers, and the like). Likewise, the receiver circuitry 244 may be coupled to the one or more receiver electrodes 254 directly or through one or more intermediate electrical components such as multiplexers, switches, amplifiers, and the like.

In some embodiments, separate ones of the sensor electrodes 252, 254 may be ohmically shorted together to form larger sensing elements. For example, in a first mode of operation, each of the sensor electrodes may be operated independently, and in a second mode of operation, multiple ones of the sensor electrodes may be operated together by ohmically shorting them together.

The processing system 110 implements accidental contact mitigation (ACM) to distinguish intentional touch inputs from unintended or accidental touches on the touch sensor 102. For example, the processing system 110 may use the ACM algorithm to classify a touch as a palm touch and identify the classified palm touch as an accidental contact, thus disregarding the touch. The ACM algorithm may reduce the occurrence of unintended or false touch inputs on the input device 100, aiming to improve the accuracy and reliability of touch sensing by distinguishing intentional touches from accidental ones. Adaptive ACM is utilized to determine adjustments to the ACM algorithm based on user characteristics from usage data. The processing system 110 utilizes adaptive ACM to dynamically update parameters within the ACM algorithm, thereby optimizing the performance of the ACM for each user.

Figures 3A, 3B:
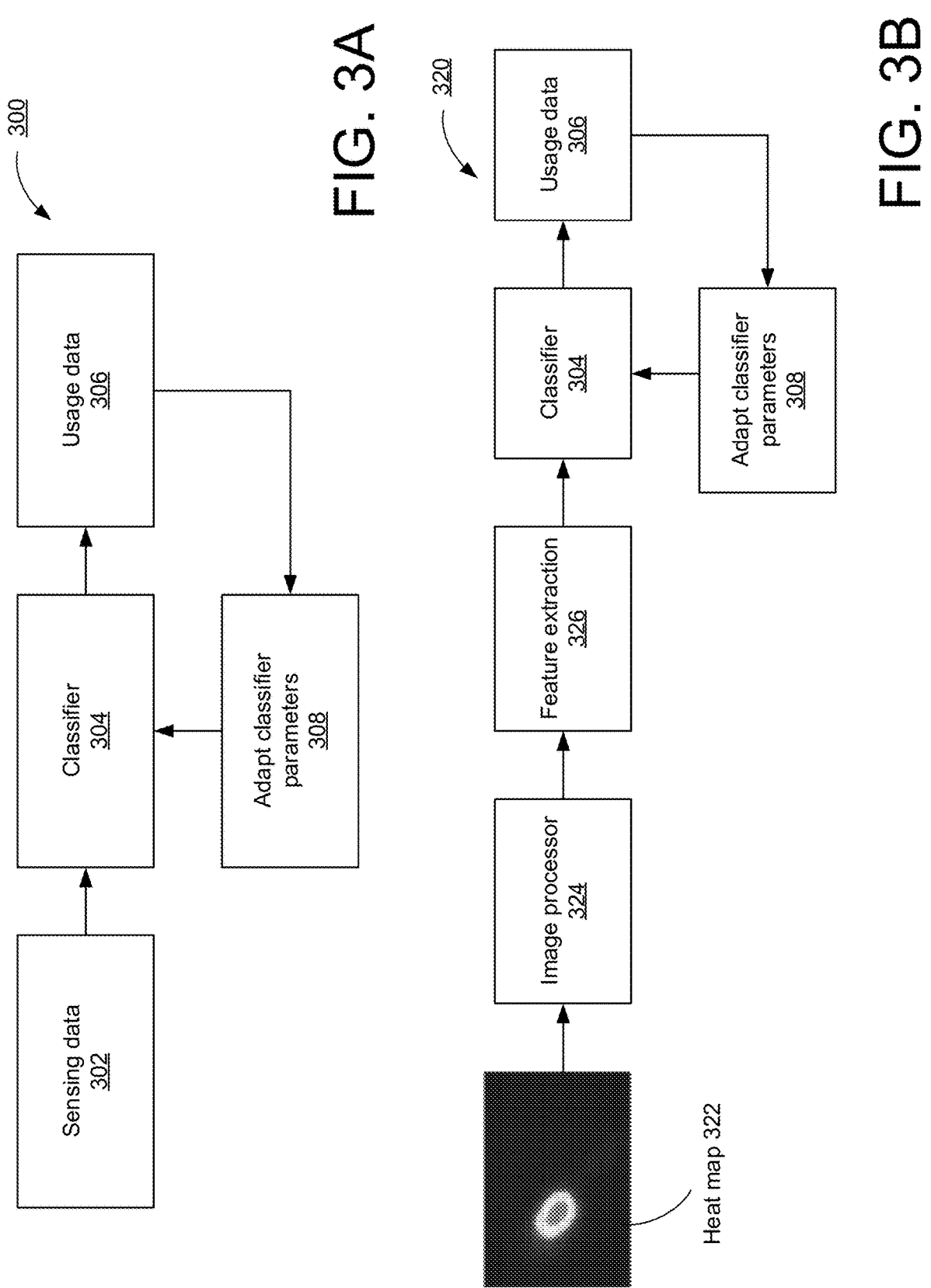
FIG. 3A is a flowchart of an exemplary process for processing data from a sensor device by implementing adaptive accidental contact mitigation (ACM) in accordance with certain embodiments.
FIG. 3B is a flowchart of an exemplary process for processing data from a sensor device by implementing adaptive ACM in accordance with certain embodiments.

FIG. 3A is a flowchart of an exemplary process 300 for processing data from a sensor device by implementing an adaptive ACM process. For example, the process 300 may be performed by the processing system 110 to process sensing data acquired by the sensor 102 in the input device 100.

At block 302, the processing system 110 obtains sensing data from the sensor 102. The sensing data may indicate electrical signals detected by the electrode array in the sensor 102 over a predefined time period. In some embodiments, each instance of sensing data input is viewed as one frame of a touch image, covering either a portion or the entire sensing region 104 of the sensor 102. The processing system 110 may perform any appropriate amount of processing on the sensing data (e.g., a touch image) to identify one or more touch regions. In some examples, the processing system 110 segments the touch image into segmented regions, referred to as clumps. Each segmented region includes an active touch region corresponding to a touch. The processing system 110 determines characteristics (e.g., attributes or features) associated with the clumps.

The characteristics associated with each clump may encode various properties of the particular clump. For example, various attributes may be obtained, including identity, area, signal, dimensions, and more. Identity attributes may include, but not limited to, frame index, timestamp, ground truth label, and/or other relevant attributes. In some embodiments, the ground truth label may be used for training and/or tuning of the adaptive ACM during a training stage. Area attributes may include, but are not limited to, clump area, hover area, normalized area (e.g., normalized by signal strength), and/or other relevant attributes. Signal attributes may include, but are not limited to, average signal strength for a touch clump, peak signal strength, and/or other relevant attributes. Dimension attributes may include, but are not limited to, clump width, clump height, edge touch flag, and/or other relevant attributes.

In some embodiments, the processing system 110 receives a sequence of touch images. The processing system 110 segments the touch regions in the touch images into clumps (e.g., the individual touch segments) and tracks the clumps across frames. The processing system 110 determines characteristics (e.g., attributes) for each clump and store the results (e.g., the attributes and/or the later ACM classification results) in memory space designated for storing usage data.

At block 304, the processing system 110 utilizes a classifier to determine one or more categories associated with the sensing data. The processing system 110 utilizes a set of classifier parameters to determine the one or more categories for the clumps based on their characteristics (e.g., attributes). For example, the processing system 110 may use the set of classifier parameters to assess attributes associated with an input clump(s) to distinguish between finger/thumb and thumb/palm touches in hover area, area, and/or normalized area spaces.

In some embodiments, the processing system 110 implements an ACM classifier to generate ACM outputs for each clump based on its corresponding attributes. For example, the ACM output for each clump may fall under one of the following categories—"Palm," "Finger," "LightPalm," "Thumb," "Hover," and "None."

The ACM classifier utilizes various attributes/features (e.g., attributes/features extracted from the touch clumps) to classify touches (e.g., clumps) into various categories. For example, a set of parameters (e.g., a slope and offset) may define a boundary line that distinguishes solid contact (finger, thumb, and palm) from light palm (e.g., as "LightPalm") and hover (e.g., as "Hover") contacts.

In further embodiments, the processing system 110 (e.g., or the ACM classifier) may employ additional algorithms, such as hysteresis, edge conditions, and LGM (low ground mass) corrections, to classify the input contacts.

At block 306, the processing system 110 processes usage data. The processing system 110 applies adaptive ACM to process the usage data to determine an adjustment to the current set of classifier parameters. In some embodiments, the processing system 110 dynamically updates the set of classifier parameters based on the usage data.

The usage data may encompass various types of information. For example, the usage data may include characteristics and/or classification results corresponding to input clumps that were previously stored in the designated memory space. In certain scenarios, the usage data may also be associated with additional information, such as user-specific identity details, timestamps indicating when the information was acquired, and more. In further examples, the usage data may include statistics/distributions derived from historical usage data.

At block 308, the processing system 110 adapts the classifier parameters based on the usage data. For example, the processing system 110 updates the set of updated classifier parameters in the classifier based on the determined adjustment from executing block 306. Subsequently, the processing system 110 processes the next instance of sensing data using the set of updated classifier parameters.

In some embodiments, the processing system 110 continuously executes the process 300 to process a sequence of touch images and dynamically update the classifier based on the usage data. In some embodiments, the processing system 110 executes the process 300 at periodic or predetermined time intervals (e.g., in accordance with a system setting or parameter). The execution of the process 300 may also be triggered in response to detected events, such as identifying a new user based on changes in the usage data.

FIG. 3B is a flowchart of an exemplary process 320 for processing data from a sensor device by implementing adaptive ACM. For example, the process 320 may be performed by the processing system 110 to process sensing data acquired by the sensor 102 in the input device 100.

In this example, the sensing data (in block 302) obtained from the sensor 102 is visualized as a heat map 322. The heat map 322 depicts a touch map in a color scale or gray scale.

The heat map 322 represents the signal distribution across the sensing region 104 of the sensor 102. Each pixel in the heat map 322 represents the signal strength of a corresponding electrode (e.g., electrode 252, 254 in FIG. 2) or a predefined cluster of electrodes within the sensing region (e.g., region 104 in FIG. 1) of the sensor 102 (or sensor 202 in FIG. 2).

At block 324, an image processer processes the sensing data (e.g., the heat map 322). The image processer may be integrated in the processing system 110 or operate in conjunction with the processing system 110. The image processer receives the heat map 322 as input, and then segments the heat map 322 to generate segmented touch regions (e.g., clumps) corresponding to one or more active touch regions. For example, each segmented touch region corresponds to one active touch region in the sensing region represented by the heat map 322.

In an example, the image processor determines one or more blobs to represent the one or more active touch regions. A blob defines a group of pixels (e.g., in the heat map 322) that form a colony or a large object that is distinguishable from its background. A segmented touch region (or clamp) in a touch image (e.g., the heat map 322) may include at least one blob and some background pixels. Tracking the clumps across touch image frames may be facilitated by tracking the corresponding blobs.

At block 326, the image processor extracts features (e.g., attributes) for each clump. For example, the image processer may extract spatial and temporal features that encode the properties of a touch region corresponding to the clump.

Similar to the process 300, the processing system 110 utilizes a classifier (e.g., an ACM classifier) to determine one or more categories for the clump (at block 304). For example, the processing system 110 determines whether the segmented touch (clump) corresponds to a finger, palm, thumb, etc., based on the extracted features (e.g., attributes). The classifier is executed by the image processor or a separate processor within the processing system 110. The ACM classifier applies a set of classifier parameters to determine the various categories for the clump. The classifier parameters may be fixed across users. In the present disclosure, the processing system 110 utilizes adaptive ACM to analyze usage data (at block 306) and adapt classifier parameters based on the current user (at block 308).

Figure 4:
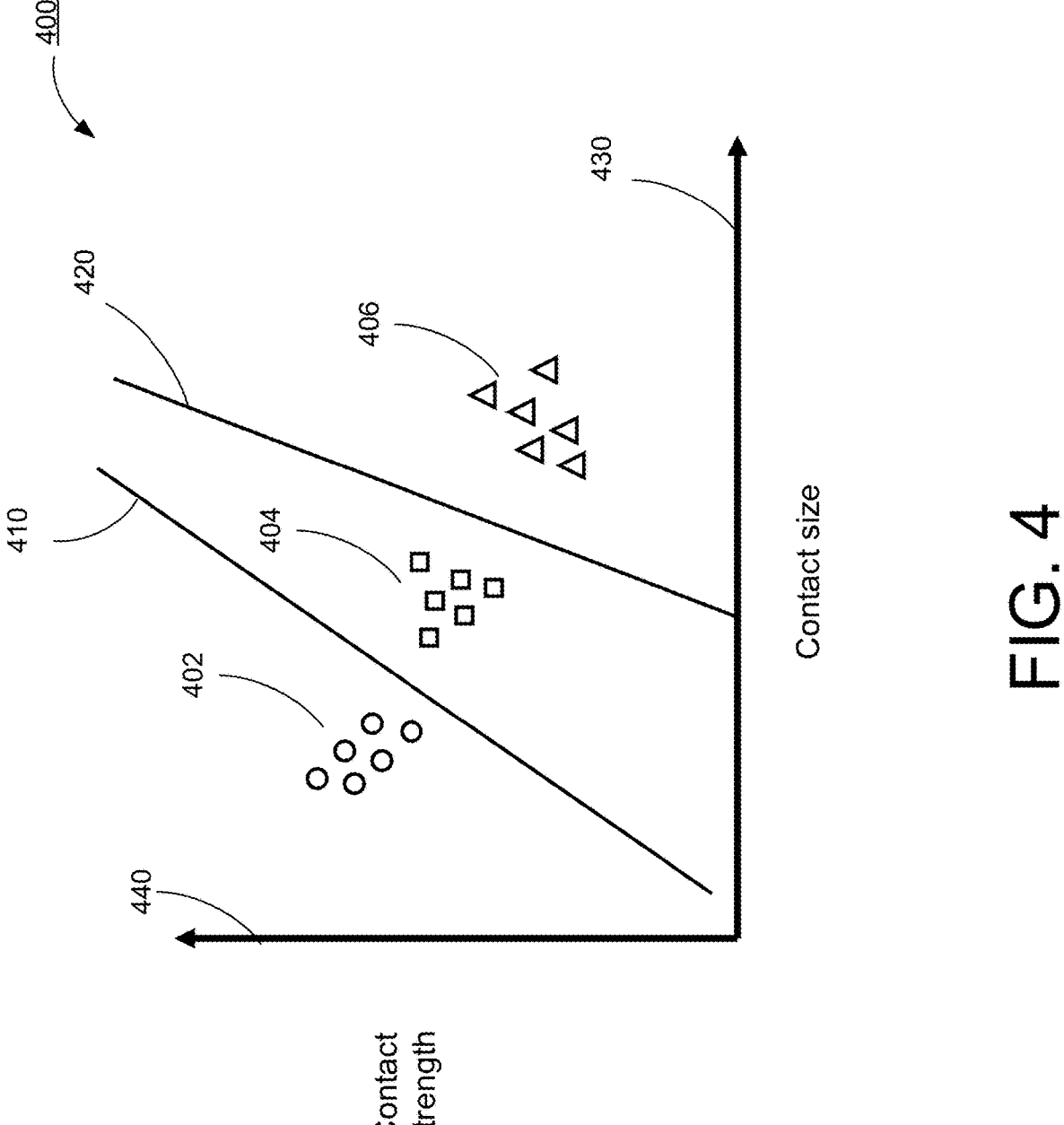
FIG. 4 is a plot that shows an exemplary application of classifier parameters to perform classification in accordance with certain embodiments.

FIG. 4 is a plot 400 that shows an exemplary application of classifier parameters to perform classification. The classifier parameters may be used by the classifier (at block 304) as depicted in FIGS. 3A and 3B to determine one or more categories of the clumps.

In this example, the plot 400 displays multiple instances of touch data (e.g., clumps, segmented regions, etc.), represented by circles, squares, and triangles. The instances of touch data are classified based on two classifier parameters corresponding to contact size and contact strength. As shown in FIG. 4, the contact size is represented on the horizontal axis 430, while the contact strength is represented on the vertical axis 440.

Each touch data instance is associated with a contact size and a contact strength. For example, the image processor (or the processing system 110) extracts the contact size and contact strength by performing feature extraction (in block 326) on an input heat map 322, as demonstrated in the process 320 depicted in FIG. 3B. The touch data instance is plotted on the graph based on its contact strength and contact size, indicating its corresponding position according to these parameters.

The two classifier parameters are visualized as line 410 and line 420, respectively, which are used to classify the touch data instances into three categories 402, 404, and 406. For example, the categories 402, 404, and 406 may indicate finger touches, thumb touches, and palm touches, respectively. The classifier parameters 410 and 420 may indicate thresholds for distinguishing between finger touches and thumb/palm touches, as well as between finger/thumb touches and palm touches, respectively. The adaptive ACM determines adjustments to the classifier parameters, such as changing the slope and/or offset of line 410 and/or line 420, to modify the classification process for future touch instances.

It will be appreciated that the application of classifier parameters depicted in FIG. 4 is merely an example, and that the principles discussed herein may also be applicable to other scenarios. For example, this could involve incorporating different types of classifier parameters, varying the number of classifier parameters, and more.

Adaptive ACM is used to predict an optimal parameter set for each user based on their usage characteristics. Example of gestures that users employ while using a touchpad are swipe (also called pointing), flick and tap, although other gestures are possible. Out of these three gestures, the swipe gesture is most often performed using index/middle finger. Additionally, the swipe gesture is often the most common gesture that is intentionally performed in a touchpad to move the cursor to different parts of the display. In light of the foregoing, the adaptive ACM may estimate the per-user optimal parameters based on individual finger swipe characteristics. However, it will be appreciated by those skilled in the art that the adaptive ACM can utilize any suitable touchpad gestures. In some examples, the adaptive ACM may estimate the per-user optimal parameters based on characteristics from multiple different gestures.

For purposes of illustration and not limitation, the adaptive ACM may predict the optimal parameter set using an average finger swipe area (also called finger-swipe-mean) for a particular user. In an example, the processing system 110 gathers and stores data related to finger swipe characteristics and subsequently determines the finger swipe mean, which is then used by the adaptive ACM. In another example, the processing system 110 applies suitable ACM methods and/or adaptive ACM to process the finger swipe characteristics to determine the finger swipe mean.

Figure 5:
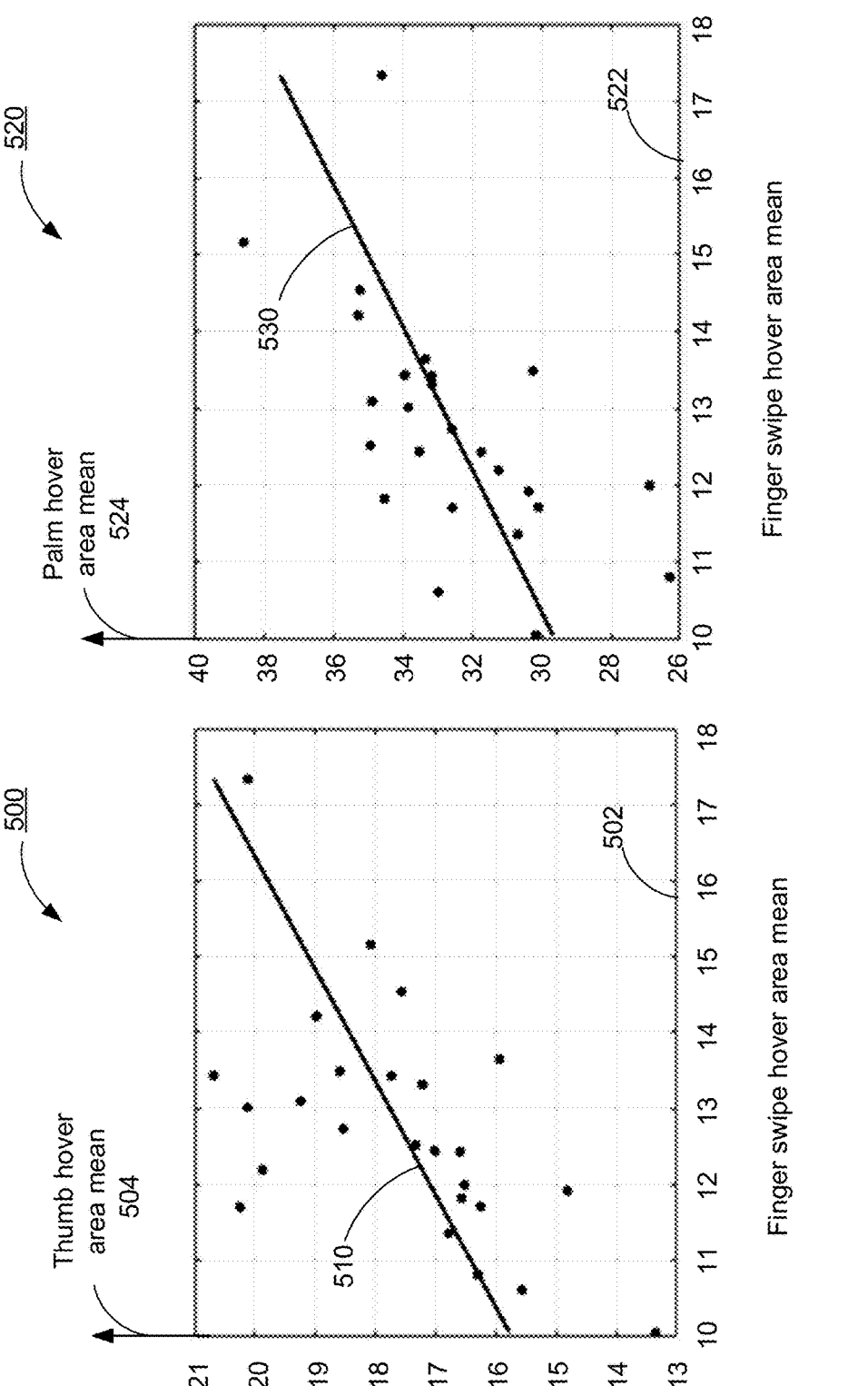
FIG. 5 illustrates correlation between finger size and thumb/palm size in accordance with certain embodiments.

FIG. 5 illustrates correlation between finger size and thumb/palm size. Plot 500 shows a relationship between finger swipe mean (in horizonal axis 502) and thumb mean (in vertical axis 504) concerning the hover area attribute. Plot 520 shows a relationship between finger swipe mean (in horizonal axis 522) and palm mean (in vertical axis 524) concerning the hover area attribute. In plots 500 and 520, the points represent data obtained from 25 test subjects, and lines 510 and 530 are fitting lines that may be generated through linear regression analysis.

Plots 500 and 520 illustrate an example of where as finger size (or finger area in touchpad) increases, the thumb size and palm size also increase. As an example, the correlation coefficient (CC) between finger swipe mean and thumb mean may be 0.56 and CC between finger swipe mean and palm mean may be 0.62 using hover area attribute. This indicates that as finger swipe mean parameter increases, the classifier parameters that separate finger/thumb and thumb/palm in area space may increase as well to improve the performance of the classifier. One example of a way to ensure the monotonicity in the model is to use linear regression to predict the per-user optimal parameter set, given the finger swipe mean of hover area. However, it will be appreciated that various other suitable techniques can also be employed to establish a monotonic relationship between finger size and thumb/palm size, depending on the specific requirements and characteristics of the data. The adaptive ACM may learn a scale vector ($\bar{s}$) and an offset vector ($\bar{o}$) to determine the parameters of the ACM classifier as:

$$\bar{p} = \bar{s} * \text{finger\_swipe\_mean} + \bar{o}, \tag{Eq. 1}$$

where $\bar{p}$ represents the set of parameters to be used by the ACM classifier.

In some embodiments, the processing system 110 estimates the finger swipe mean dynamically when the user is operating the touchpad. For example, the processing system 110 determines valid swipe contacts from which the usage data and/or statistics can be collected. In some examples, the processing system 110 employs an image processing algorithm to track the touch contacts across touch image frames. A single contact may be denoted as a track T. The length (distance covered by track), duration, and area-mean of the $j^{th}$ track may be denoted by $$T_j^{dist}, T_j^{time}$$

and $$T_j^{area},$$

respectively. The processing system 110 may determine a track as a valid swipe when the following conditions are met:

$$T_j^{dist} > thres^{dist}, \tag{Eq. 2A}$$

$$T_j^{time} > thres^{time}, \tag{Eq. 2B}$$

$$T_j^{area} \leq thres^{area}, \tag{Eq. 2C}$$

where "thres" represents a threshold for the corresponding parameter(s).

In some embodiments, the processing system 110 estimates the finger swipe mean parameters in an online manner while the user is operating the touchpad. For example, when the processing system 110 determines a new swipe (e.g., with an average hover area (or hover area mean) as swipe mean), the processing system 110 updates the current finger swipe mean to get an updated finger swipe mean by the following equation, $$\text{finger}_{swipe\ mean}^{updated} = \alpha * \text{finger}_{swipe\ mean}^{current} + (1 - \alpha) * \text{swipe\_mean}, \tag{Eq. 3}$$

where a is an adjustable parameter. The value of a plays a significant role in determining the update speed of the finger swipe mean. To clarify, a smaller value of a will lead to a faster update speed for the finger swipe mean. In this context, a essentially acts as a weighting factor, influencing how quickly or slowly new data points are integrated into the calculation of the finger swipe mean. A smaller a gives more weight to recent data, causing the mean to adapt more swiftly to changes in input behavior, while a larger a would result in a slower adaptation process. The choice of a is used for balancing the need for responsiveness with the desire for stability and accuracy in the parameter updates.

In some embodiments, the processing system 110 updates finger swipe mean using a predefined a. The predefined a may be a default value and/or determined through calibration. Furthermore, the a parameter may also change dynamically during user interaction with the input device. For example, the a value may automatically adapt due to various events, such as: detecting the awakening of the input device 100 from an idle state, detecting changes to user preference/settings through user input, detecting a new user (e.g., based on changes in the usage data), detecting alterations in environmental conditions (e.g., lighting conditions), detecting of low battery levels, and other suitable situations.

The user characteristics (e.g., finger swipe mean) may be determined offline, online, and/or dynamically.

Figure 6A:
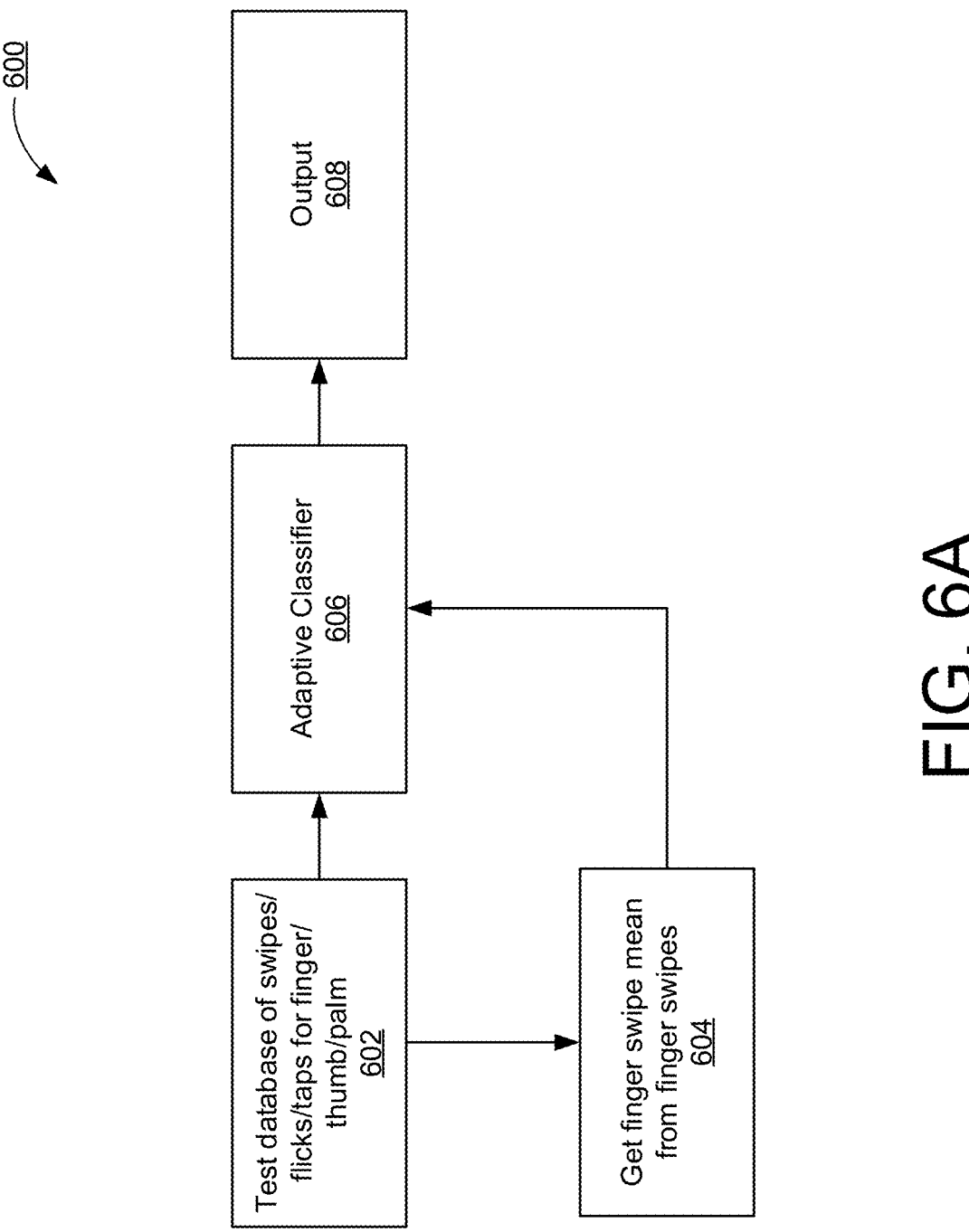
FIG. 6A illustrates a flowchart computing the finger swipe mean parameter offline from a test database in accordance with certain embodiments.

FIG. 6A illustrates a flowchart 600 for computing the finger swipe mean parameter offline from a test database in accordance with one or more examples. The processes in the flowchart 600 may be performed by a processing system integrated in or coupled to the input device 100. It will be appreciated that the processes in the flowchart 600 need not be performed in the exact sequence shown. For example, the processes in the flowchart 600 can be performed in the opposite order. It will further be appreciated that certain processes may be optional.

At block 602, a test database stores data related to swipes/flicks/taps for finger/thumb/palm. The processing system may access the test database from local memory or through cloud-based storage.

At block 604, the processing system gets finger swipe mean from finger swipes. In some examples, the processing system applies Equations 2A-2C to determine valid swipes corresponding to finger swipes. The processing system determines a fixed finger swipe mean based on the finger swipes obtained from the test database.

At block 606, the processing system determines an adaptive classifier. For example, the processing system applies Equation 1 to determine a set of updated parameters for the adaptive classifier. In some examples, the processing system applies Equation 3 with additional input data (e.g., additional finger swipes) to determine updated finger swipe mean.

At block 608, the processing system outputs the adaptive classifier. The processing system then uses the adaptive classifier with updated classifier parameters to classify the subsequent sensing data from an input device (e.g., the input device 100).

Figure 6B:
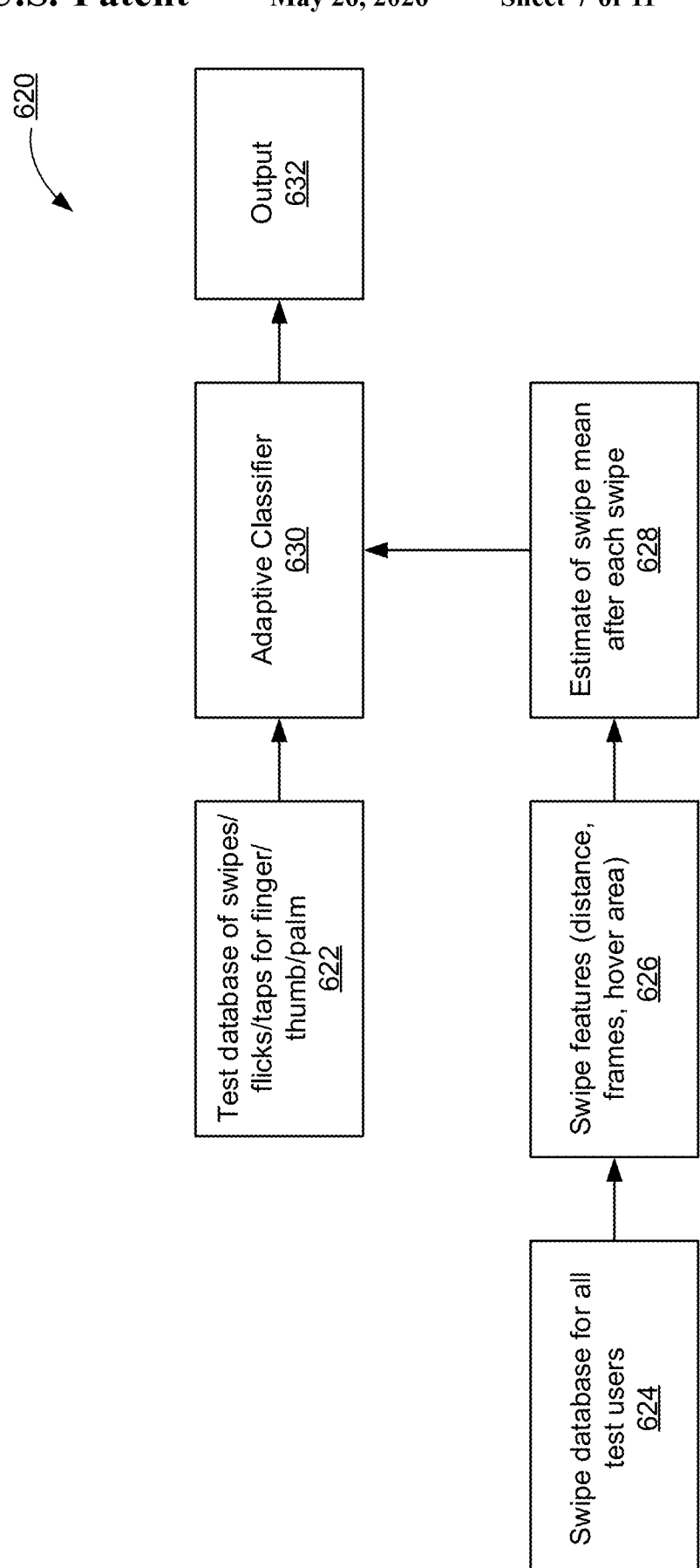
FIG. 6B illustrates a flowchart for computing the finger swipe mean parameter online from a test database in accordance with certain embodiments.

FIG. 6B illustrates a flowchart 620 for computing the finger swipe mean parameter online from a test database in accordance with one or more examples. The processes in the flowchart 620 may be performed by a processing system integrated in or coupled to the input device 100. It will be appreciated that the processes in the flowchart 620 need not be performed in the exact sequence shown. For example, the processes in the flowchart 620 can be performed in the opposite order. It will further be appreciated that certain processes may be optional.

At block 622, a test database stores data related to swipes/flicks/taps for finger/thumb/palm. The processing system may access the test database from local memory or through cloud-based storage. In some examples, the processing system performs processes in the flowchart 600 to determine an initial finger swipe mean for an initial adaptive classifier based on the finger swipes obtained from the test database.

At block 624, a swipe database stores data for all test users. The processing system may access the swipe database from local memory or through cloud-based storage.

At block 626, the processing system determines one or more swipe features based on the data from the swipe database. In some embodiments, the processing system determines distance, frame, hover area, and/or other suitable features, for each swipe.

At block 628, the processing system estimates a swipe mean after each swipe. For example, the processing system applies Equation 3 to determine an updated swipe mean based on the current swipe mean and the new swipe.

At block 630, the processing system determines an adaptive classifier. For example, the processing system applies Equation 1 using the swipe mean estimated from 628 and the predefined/calculated scale vector ($\bar{s}$) and offset vector ($\bar{o}$) to determine a set of updated parameters for the adaptive classifier.

At block 632, the processing system outputs the adaptive classifier. The processing system then uses the adaptive classifier with updated classifier parameters to classify the subsequent sensing data from an input device (e.g., the input device 100).

Figure 6C:
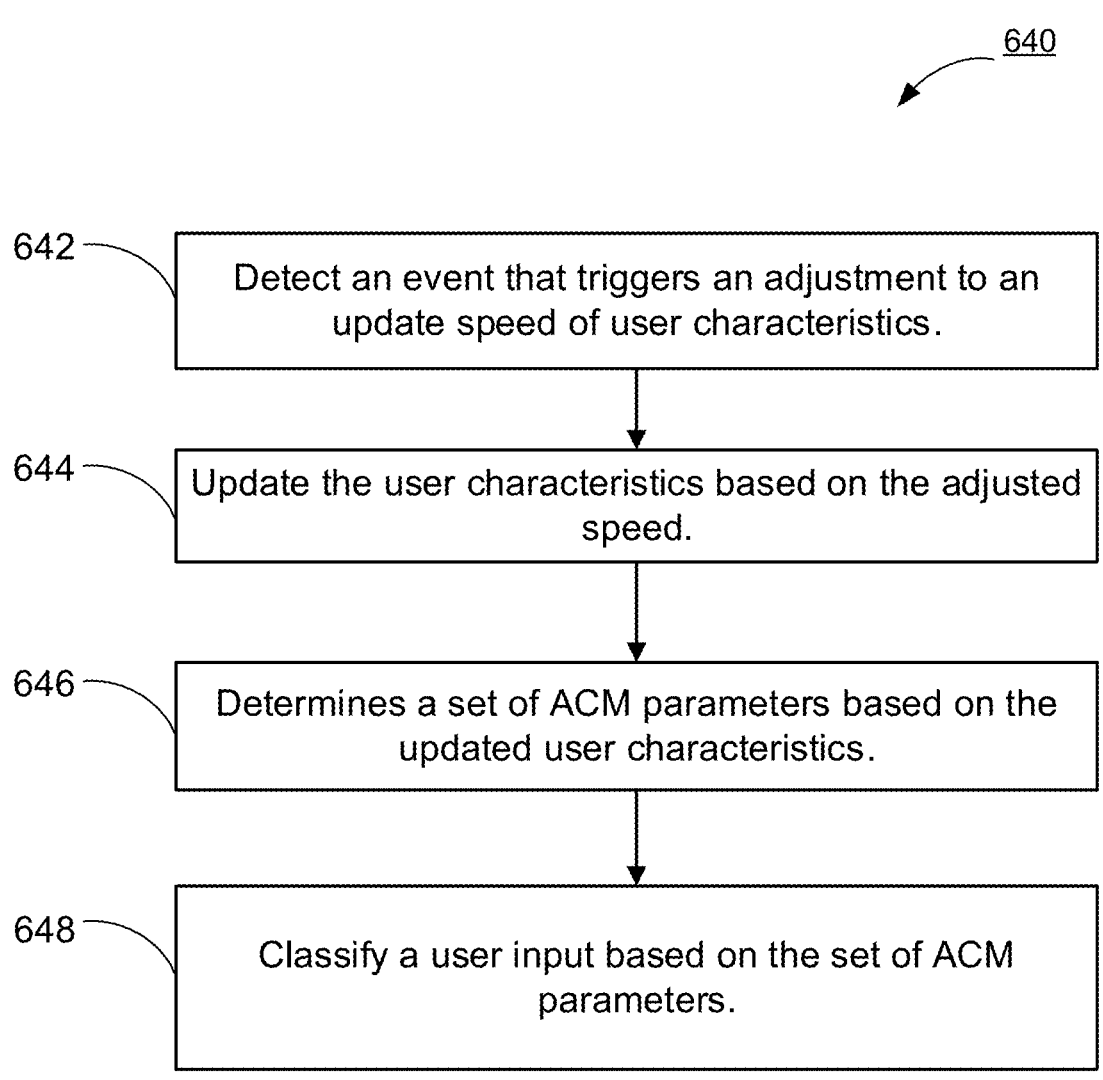
FIG. 6C illustrates a method for dynamically adjusting an adjustable parameter in accordance with certain embodiments.

FIG. 6C illustrates a method 640 for dynamically adjusting the adjustable parameter a in accordance with one or more examples. The method 640 may be performed by a processing system integrated in or coupled to the input device 100. It will be appreciated that the method need not be performed in the exact sequence shown except where otherwise apparent. It will further be appreciated that certain steps may be optional.

At block 642, the processing system detects an event that triggers an adjustment to the update speed of user characteristics (e.g., finger swipe mean). For example, depending on the type of event, the processing system determines a corresponding value for the parameter a, which is then applied to Equation 3.

At block 644, the processing system updates the user characteristics based on the adjusted speed. For example, the processing system applies Equation 3 to update the finger swipe mean based on the adjusted parameter a.

At block 646, the processing system determines a set of ACM parameters (e.g., ACM classifier parameters) based on the updated user characteristics. For example, the processing system applies Equation 1 to determine the set of ACM parameters.

At block 648, the processing system classifies a user input based on the set of ACM parameters. For example, the processing system uses the ACM classifier with the updated parameters to classify a clump and identify the touch.

Figure 7:
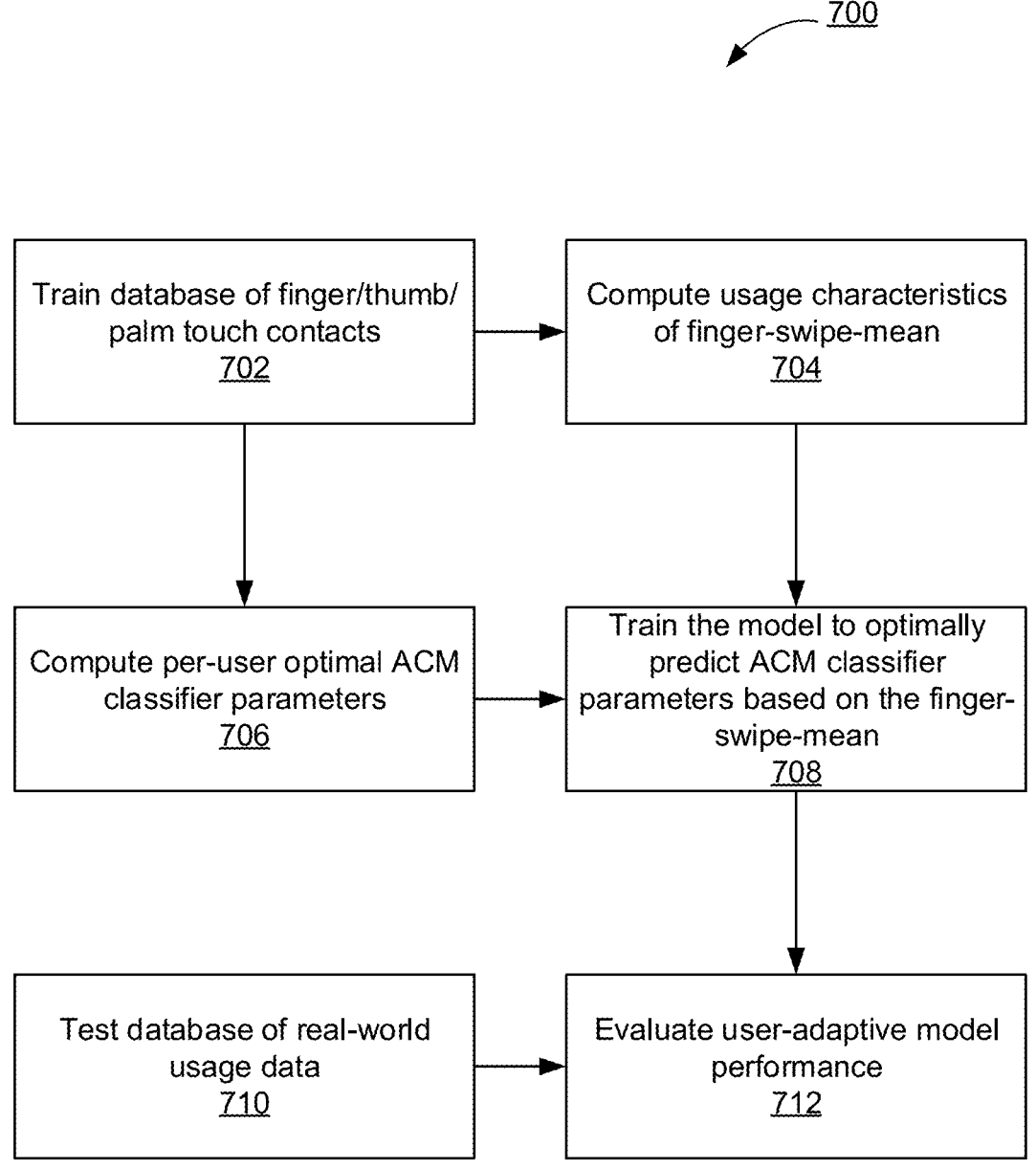
FIG. 7 illustrates a method for tuning the adaptive ACM model.

FIG. 7 illustrates a method 700 for tuning the adaptive ACM model. The method 700 may be performed by a processing system integrated in or coupled to the input device 100. It will be appreciated that the method need not be performed in the exact sequence shown, except where otherwise apparent. It will further be appreciated that certain steps may be optional.

At block 702, the processing system trains a model based on a database of finger/thumb/palm touch contacts.

At block 704, the processing system computes usage characteristics of finger-swipe-mean based on the dataset in block 702. It will be appreciated that other types of usage characteristics (e.g., corresponding to other gestures) may be computed and utilized by the adaptive ACM model.

At block 706, the processing system computes per-user optimal ACM classifier parameters based on the database in block 702.

At block 708, the processing system trains the adaptive ACM model to optimally predict ACM classifier parameters based on the finger-swipe-mean. It will be appreciated that other types of usage characteristics (e.g., corresponding to other gestures) may be computed and utilized by the adaptive ACM model.

At block 710, the processing system obtains data from a test database of real-world usage data.

At block 712, the processing system evaluates the model (e.g., the adaptive model) performance based on the test database in block 710 and the prediction made by the model obtained from block 708. The processing system may adjust tunable parameters in the adaptive ACM process based on the evaluation results.

In an example, the various classifier output types may be Palm, Finger, LightPalm, Thumb, Unknown, Hover, SmallObj, NegFinger, and None. If the ground truth is type_gt and classifier output is type_out, an error score for the pair (type_gt, type_out) may be defined using an error matrix 800 as shown in FIG. 8.

Figure 8:
FIG. 8 shows an error matrix for ground truth versus classification output.

FIG. 8 shows an error matrix 800 for ground truth versus classification output. As shown in the matrix 800, all errors are not penalized the same based on this error matrix.

The error score for a dataset (or data capture) is defined as the average error score for each frame in the dataset. The error for a subject is the average of error scores across all data captures for the subject. The final error score is an average of subject level scores as:

$$\text{Overall Error Score}(\bar{p}) = \qquad\qquad (\text{Eq. } 4)$$

$$\frac{1}{S}\left(\sum_{k=1}^{S}\left(\sum_{j=1}^{M_k}\left(\frac{1}{N_{jk}}\left(\sum_{i=1}^{N_{jk}} \text{error score}^{\bar{p}}(gt^{ijk}, out^{ijk})\right)\right)\right)\right)$$

where S is the number of subjects, $M_k$ is the number of data captures for a subject k and $N_{jk}$ is the number of frames for subject k and data capture index j and i corresponds to the index of the frame within a dataset.

In addition to the error score which summarizes the performance across all users, the processing system also computes confusion matrix metrics that indicate the confusion across various classifier categories. For example, a confusion_matrix (thumb, palm) indicates the percentage of times a thumb touch was classified as a palm touch.

The processing system estimates the optimal parameter set that minimizes error scores. In some embodiments, the processing system analyzes one or more parameters among the classifier parameters to tune the classifier (and the ACM attributes are integers) for minimized error score. For example, the processing system performs a grid search with respect to the parameters, compute the error score for each parameter setting, and identify the best set of parameters that minimizes the error score. It will be appreciated that other suitable approaches may also be applied to obtain the optimal parameters. Accordingly, the processing system determines an optimal per-user parameter estimate and global optimal parameter estimation.

The parameter setting that minimizes the error score for each user is the per-user optimal parameter setting. For subject k, the optimal parameter set $\bar{P}_k$ is defined as:

15

$$\overline{p_k} = \operatorname*{argmin}_{\overline{p_k}} \sum_{j=1}^{M_k}\left(\frac{1}{N_{jk}}\left(\sum_{i=1}^{N_{jk}} \text{error score}^{\overline{p_k}}(gt^{ijk}, \text{out}^{ijk})\right)\right). \quad \text{(Eq. 5)}$$

The parameter setting that minimizes the error score averaged across all users is the global optimal parameter setting. This can be computed as:

$$\overline{p} = \operatorname{arg} \quad \text{(Eq. 6)}$$
$$\operatorname*{min}_{\overline{p}}\left(\sum_{k=1}^{S}\frac{1}{M_k}\left(\sum_{j=1}^{M_k}\left(\frac{1}{N_{jk}}\left(\sum_{i=1}^{N_{jk}} \text{error score}^{\overline{p}}(gt^{ijk}, \text{out}^{ijk})\right)\right)\right)\right).$$

Results

In an example, 25 people were used for test and four subjects were used for training parameter estimation. The training parameter estimation was used for a subset of the experiments. The various examples performed on this dataset are described below.

A. Error Score Analysis

Table 1 show the performance of error score versus various parameter tuning approaches. The exemplary improvements are relative to a parameters baseline. Effects of hysteresis, edge/corner cases and LGM (low ground mass) cases are excluded from these results.

TABLE 1

Error scores for various ACM classifier parameter tuning approaches.

| S. No | Parameter setting | Error score | % Improvement |
|---|---|---|---|
| 1 | Baseline | 8.32 | 0% |
| 2 | Per-person optimal parameters | 4.36 | 47.6% |
| 3 | Global optimal parameters | 5.14 | 38.2% |
| 4 | Global optimal parameters (train/val) | 5.39 | 35.2% |
| 5 | User adaptive tuning | 4.68 | 43.4% |

16

In Table 1, the entries for different rows correspond to the following:

1. The baseline uses fixed ACM classifier parameters. In this example, these parameters are calibrated based on a general case scenario, rather than being tailored to specific users.
2. The per-person optimal parameters refer to examples of optimal parameters for each user reflecting about 48% improvement over the baseline estimate. In the example, this serves as an upper bound to the performance that can be achieved by tuning the parameters for the ACM.
3. Global optimal parameters refers to an example of best possible result by a global fixed parameter set across all users. This parameter set is derived from the same 25 users used for testing.
4. Global optimal train/val refers to obtaining an example of global optimal parameters using the training set of four users and applying this parameter set to the test users as validation.
5. User adaptive tuning is a tuning approach using the average hover area of the finger swipe mean. Here, the knowledge of the finger swipe mean is assumed. In the example, user adaptive tuning provides about 43% improvement, which in the example is close to a theoretical best possible 48% by per-person parameter estimation.

B. Confusion Across Categories

Table 2 below indicates an example of confusion across various categories. Each column in the table corresponds to (ground truth, classifier output) combinations.

An accidental contact issue typically happens when a palm is registered as a thumb or finger, or finger/thumb is registered as a palm. This type of error may, for example, be reduced to 1.1% by the proposed user adaptive tuning algorithm from the Table 2 below.

TABLE 2

Confusion matrix across various ground truth - classifier output pairs

| Parameter setting | Finger-finger | Thumb-thumb | Palm-palm | Finger-Thumb | Finger-Palm | Thumb-Finger | Thumb-Palm | Palm-Finger | Palm-Thumb |
|---|---|---|---|---|---|---|---|---|---|
| Baseline params | 97.80% | 6.30% | 91.28% | 0.03% | 0.00% | 87.52% | 0.00% | 1.61% | 1.28% |
| Per-person optimal params | 89.93% | 78.39% | 94.83% | 7.91% | 0.00% | 15.40% | 0.05% | 0.31% | 0.51% |
| Global optimal params | 79.18% | 81.07% | 94.17% | 18.66% | 0.00% | 12.68% | 0.07% | 0.29% | 0.98% |
| Global optimal params (train/val) | 93.22% | 59.94% | 93.92% | 4.62% | 0.00% | 33.82% | 0.07% | 0.49% | 1.03% |
| User adaptive tuning | 87.90% | 79.10% | 94.20% | 9.90% | 0.00% | 14.70% | 0.00% | 0.30% | 0.80% |

C. Adaptive ACM Performance

The examples above assume knowledge of the finger swipe mean for each user. In practice, adaptive ACM may be used to dynamically estimate the finger swipe mean and update the ACM classifier parameters during user operation according to Equations 1 and 2. Examples may be conducted using the normal interaction database from five users described above. The adaptive ACM may be used to continuously estimate the finger swipe mean after each swipe and use the estimated finger swipe mean to adapt the classifier parameters and test on the test database. As demonstrated with reference to FIG. 6A, for user adaptive tuning results, the adaptive ACM determines a fixed finger swipe mean for each user. As demonstrated with reference to FIG. 6B, the adaptive ACM dynamically estimate the finger swipe mean after each valid swipe and use the finger swipe mean to modify the ACM parameters.

Figure 9:
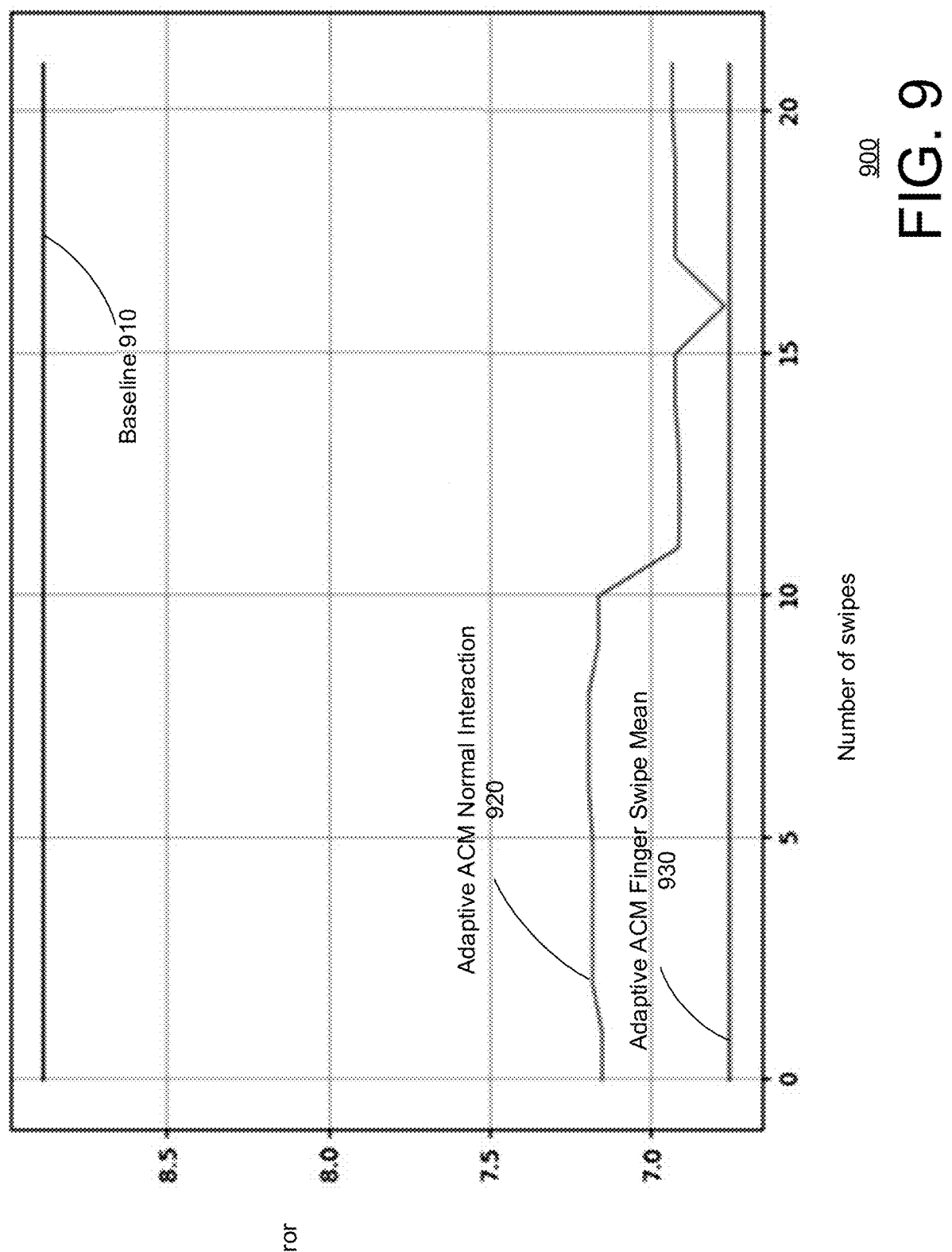
FIG. 9 is a plot that indicates the ACM performance versus the number of swipes for three cases.

In the example, normal interaction data is collected on five users. FIG. 9 is a plot 900 that indicates the ACM performance versus the number of swipes for three cases.

Referring to FIG. 9, the three exemplary cases are: (i) baseline 910 that indicates baseline parameters similar to Table 2; (ii) Adaptive ACM Normal Interaction 920 that indicates ACM classifier parameters tuned from dynamic estimation of finger swipe mean; and (iii) Adaptive ACM Finger Swipe Mean 930 that indicates ACM classifier parameters tuned by finger-swipe-mean estimation from the test dataset, which is a single value. Adaptive ACM Normal Interaction 920 is estimated from normal interaction data. Adaptive ACM Finger Swipe Mean 930 is estimated offline from test data.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (e.g., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for classifying touch data, comprising:
a plurality of sensing elements; and
a processing system configured to:
    receive touch data from a current user via the plurality of sensing elements;
    apply a second set of classifier parameters to classify the touch data;
    determine, based on usage data and the second set of classifier parameters, a first set of classifier parameters corresponding to the current user, wherein the usage data comprises the touch data from the current user; and
    apply the first set of classifier parameters to classify subsequent touch data.

2. The system of claim 1, wherein the touch data comprises a touch image corresponding to a sensing region associated with the plurality of sensing elements.

3. The system of claim 2, wherein the processing system is further configured to:
generate one or more segmented touch images from the touch image, each segmented touch image corresponding to an active touch region in the touch image; and
classify the one or more segmented touch images based on the second set of classifier parameters.

4. The system of claim 3, wherein classifying the one or more segmented touch images based on the second set of classifier parameters further comprises:
extracting, for each segmented touch image of the one or more segmented touch images, one or more features associated with the respective segmented touch image; and
classifying the respective segmented touch image by applying the second set of classifier parameters to the one or more features associated with the respective segmented touch image of the one or more segmented touch images.

5. The system of claim 1, wherein the usage data further comprises touch data that has been previously stored in a database, wherein determining the first set of classifier parameters corresponding to the current user is further based on the touch data that has been previously stored in the database.

6. The system of claim 5, wherein the processing system is further configured to:
determine a first average value associated with the touch data from the current user;
determine a second average value associated with the touch data that has been previously stored in the database; and
update the first set of classifier parameters based on the first average value and the second average value.

7. The system of claim 6, wherein the first average value and the second average value are determined based on finger swipe characteristics.

8. The system of claim 6, wherein the first set of classifier parameters is dynamically updated with a predefined speed, wherein the predefined speed is associated with a tunable weight that corresponds to the first average value.

9. The system of claim 8, wherein the processing system is further configured to:

in response to detect a change of the tunable weight, dynamically update the first set of classifier parameters with an updated speed.

10. A method for classifying touch data, comprising:

receiving, by a processing system, touch data from a current user;

applying, by the processing system, a second set of classifier parameters to classify the touch data;

determining, by the processing system, based on usage data and the second set of classifier parameters, a first set of classifier parameters corresponding to the current user, wherein the usage data comprises the touch data from the current user; and applying, by the processing system, the first set of classifier parameters to classify subsequent touch data.

11. The method of claim 10, wherein the touch data comprises a touch image corresponding to a sensing region associated with a plurality of sensing elements.

12. The method of claim 11, further comprising:

generating one or more segmented touch images from the touch image, each segmented touch image corresponding to an active touch region in the touch image; and classifying the one or more segmented touch images based on the second set of classifier parameters.

13. The method of claim 12, wherein classifying the one or more segmented touch images based on the second set of classifier parameters further comprises:

extracting, for each segmented touch image of the one or more segmented touch images, one or more features associated with the respective segmented touch image; and classifying the respective segmented touch image by applying the second set of classifier parameters to the one or more features associated with the respective segmented touch image of the one or more segmented touch images.

14. The method of claim 10, wherein the usage data further comprises touch data that has been previously stored in a database, wherein determining the first set of classifier parameters corresponding to the current user is further based on the touch data that has been previously stored in the database.

15. The method of claim 14, further comprising:

determining a first average value associated with the touch data from the current user;

determining a second average value associated with the touch data that has been previously stored in the database; and updating the first set of classifier parameters based on the first average value and the second average value.

16. The method of claim 15, wherein the first average value and the second average value are determined based on finger swipe characteristics.

17. The method of claim 15, wherein the first set of classifier parameters is dynamically updated with a predefined speed, wherein the predefined speed is associated with a tunable weight that corresponds to the first average value.

18. The method of claim 17, further comprising:

in response to detect a change of the tunable weight, dynamically updating the first set of classifier parameters with an updated speed.

19. A non-transitory computer-readable medium, having computer-executable instructions stored thereon for classification of an input object using an input device, wherein the computer-executable instructions, when executed, facilitate performance of the following:

receiving touch data from a current user;

applying a second set of classifier parameters to classify the touch data;

determining, based on usage data and the second set of classifier parameters, a set of classifier parameters corresponding to the current user, wherein the usage data comprises the touch data from the current user; and applying the first set of classifier parameters to classify subsequent touch data.

20. The non-transitory computer-readable medium of claim 19, wherein the usage data further comprises touch data that has been previously stored in a database, wherein determining the first set of classifier parameters corresponding to the current user is further based on the touch data that has been previously stored in the database.

* * * * *